(12) United States Patent
Mateosky et al.

(10) Patent No.: US 9,509,410 B2
(45) Date of Patent: Nov. 29, 2016

(54) HIGH-SPEED OPTICAL TRANSCEIVER SYSTEMS AND METHODS

(71) Applicant: Ciena Corporation, Hanover, MD (US)

(72) Inventors: John P. Mateosky, West River, MD (US); Michael Y. Frankel, Baltimore, MD (US)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 15/002,026

(22) Filed: Jan. 20, 2016

(65) Prior Publication Data

US 2016/0134376 A1    May 12, 2016

Related U.S. Application Data

(63) Continuation of application No. 14/456,217, filed on Aug. 11, 2014, now Pat. No. 9,270,377, which is a continuation of application No. 12/166,537, filed on Jul. 2, 2008, now Pat. No. 8,805,195.

(60) Provisional application No. 60/950,032, filed on Jul. 16, 2007.

(51) Int. Cl.

| H04B 10/00 | (2013.01) |
|---|---|
| H04B 10/40 | (2013.01) |
| H04L 27/20 | (2006.01) |
| H04L 27/22 | (2006.01) |
| H04B 10/27 | (2013.01) |
| H04J 14/00 | (2006.01) |
| H04J 14/02 | (2006.01) |
| H04L 1/00 | (2006.01) |

(52) U.S. Cl.
CPC .............. *H04B 10/40* (2013.01); *H04B 10/27* (2013.01); *H04L 1/004* (2013.01); *H04L 27/2096* (2013.01); *H04L 27/223* (2013.01); *H04J 14/0227* (2013.01); *H04L 1/0056* (2013.01)

(58) Field of Classification Search
CPC ....................................................... H04B 10/40
See application file for complete search history.

(56) References Cited

U.S. PATENT DOCUMENTS

| 7,116,251 | B1 | 10/2006 | Groen et al. | |
|---|---|---|---|---|
| 7,583,599 | B1 | 9/2009 | Ling et al. | |
| 7,843,962 | B2 | 11/2010 | Gunthorpe et al. | |
| 2002/0120902 | A1* | 8/2002 | Brown | H04J 3/047 714/776 |
| 2003/0016697 | A1 | 1/2003 | Jordan | |
| 2003/0091267 | A1 | 5/2003 | Alvarez et al. | |

(Continued)

Primary Examiner — Daniel Dobson
(74) Attorney, Agent, or Firm — Clements Bernard PLLC; Christopher L. Bernard; Lawrence A. Barratta, Jr.

(57) ABSTRACT

A high-speed 100G optical transceiver, such as for Infini-Band and Ethernet, with associated mapping to frame various different protocols. The optical transceiver utilizes an architecture which relies on standards-compliant (i.e., multi-sourced) physical client interfaces. These client interfaces are back-ended with flexible, programmable Field Programmable Gate Array (FPGA) modules to accomplish either InfiniBand or Ethernet protocol control, processing, re-framing, and the like. Next, signals are encoded with Forward Error Correction (FEC) and can include additional Optical Transport Unit (OTU) compliant framing structures. The resulting data is processed appropriately for the subsequent optical re-transmission, such as, for example, with differential encoding, Gray encoding, I/Q Quadrature encoding, and the like. The data is sent to an optical transmitter block and modulated onto an optical carrier. Also, the same process proceeds in reverse on the receive side.

20 Claims, 3 Drawing Sheets

(56) References Cited

U.S. PATENT DOCUMENTS

| | | | |
|---|---|---|---|
| 2003/0120799 A1* | 6/2003 | Lahav | H04J 3/1611 709/236 |
| 2003/0163555 A1* | 8/2003 | Battou | G06F 8/65 709/223 |
| 2004/0252720 A1 | 12/2004 | Xiong et al. | |
| 2006/0002304 A1 | 1/2006 | Ashwood-Smith | |
| 2006/0104317 A1 | 5/2006 | Bang et al. | |
| 2006/0193399 A1 | 8/2006 | Katagiri et al. | |
| 2006/0216958 A1* | 9/2006 | Yee | H04L 49/40 439/66 |
| 2006/0268943 A1 | 11/2006 | DeCusatis et al. | |
| 2007/0014308 A1* | 1/2007 | Gunthorpe | H04L 12/4633 370/466 |
| 2007/0076767 A1 | 4/2007 | Loprieno et al. | |
| 2008/0019463 A1 | 1/2008 | Ikeuchi et al. | |
| 2008/0075113 A1 | 3/2008 | Harley et al. | |
| 2008/0163025 A1 | 7/2008 | Djordjevic et al. | |

* cited by examiner

HIGH-SPEED OPTICAL TRANSCEIVER SYSTEMS AND METHODS

CROSS-REFERENCE TO RELATED APPLICATION(S)

The present non-provisional patent application is a continuation of U.S. patent application Ser. No. 14/456,217, filed Aug. 11, 2014, and entitled "HIGH-SPEED OPTICAL TRANSCEIVER FOR INFINIBAND AND ETHERNET," which is a continuation of U.S. patent application Ser. No. 12/166,537, filed Jul. 2, 2008, and entitled "HIGH-SPEED OPTICAL TRANSCEIVER FOR INFINIBAND AND ETHERNET," which claims priority to U.S. Provisional Patent Application Ser. No. 60/950,032, filed Jul. 16, 2007, and entitled "SYSTEMS AND METHODS FOR HIGH-SPEED DQPSK DATA STREAM REALIGNMENT AND ASSOCIATED HIGH-SPEED INTERFACES FOR INFINIBAND AND ETHERNET," each of which is incorporated in full by reference herein.

FIELD OF THE INVENTION

The present invention relates generally to high-speed optical communication systems, such as 100 Gigabit-per-second (100G) systems. More specifically, the present invention provides a high-speed 100G optical transceiver for InfiniBand and Ethernet for mapping InfiniBand and Ethernet into an OTN framed signal, in general. This includes aggregating lower rate Infiniband and Ethernet signals as well accepting eventual standards-based 40 GbE, 100 GbE, and other-related signals.

BACKGROUND OF THE INVENTION

InfiniBand (IB) technology is an advanced, Ethernet-based, packet oriented technology which provides enhanced scalability over traditional Ethernet. The scalability is a very useful feature for high performance computing (HPC) applications where the upgradeability in the number Central Processing Unit (CPU) cores and the type/capability of the CPU core is very important. Due to this need to constantly upgrade and increase the number of CPU cores or "nodes" in a given HPC cluster, InfiniBand is the Input/Output (TO) data interface of choice for such applications. There are many applications where geographically dispersed HPC sites would like to share, in real-time, and in near real-time volumes of data and intermediate results (data). Hence the need to interface these sites via a dedicated and/or shared WAN (wide-area network).

Present State-of-the-Art IB wide area network (WAN) technology is centered around 10 Gbps technology particularly using the 10 GbE local area network (LAN) protocol. This is not efficient from a fiber bandwidth and spectral efficiency point-of-view, and cannot be easily scaled to transporting rapidly increasing volumes of data. At the same time, there is a fortuitous convergence of data communication (i.e. Ethernet) and telecommunication (i.e. SONET/SDH) data rates at 10 Gbps. The continually growing network bandwidth requirements are forcing the industry to look at the next logical step in increased rate of data transport. There is some consensus that it is highly desirable to preserve the convergence of data and telecommunication rates, to leverage component, subsystem and system supplier base commonality, etc. The standards are being pursued by the IEEE Task Force 802.3ba, targeting an Ethernet based solution with a 100 Gbps media access rate.

The present shortcoming can be grouped into three categories. First, there is a general requirement for providing an architecture that can be flexibly adapted to both InfiniBand transport requirements, as well as to whatever next generation higher-speed transport is defined by the Standards groups (such as 100 Gb Ethernet, for example). Satisfying this requirement is advantageous since it leverages a single development effort, higher manufacturing volumes, and the like over a wider application space. It also allows customers to dynamically adapt the same product to fit different needs.

Second, insufficient bandwidth is a major shortcoming of the present designs related to WAN transport of both Infiniband and Ethernet data/telecom traffic. The overall bit rate is really limited to 10 Gbps as of today, generally using 10 GbE/OTU2 based technologies. At the same time, HPC clusters can produce huge amounts of data that needs to be shared. These can include, for example, data sets used for environmental modeling, data sets from hyper-spectral imaging, data sets from high-energy particle colliders, medical genomic research, and the like. Such data sets can reach Petabyte sizes and can use widely deployed specialized distributed file sharing protocols (e.g. Lustre, www.lustre.org). Sharing a Petabyte size file would require approximately $10^6$ seconds or 11.5 days if done with current 10 Gbps data technology. Thus, there is a continual desire for increased transport rate, with current activities focused on 100 Gbps.

Third, there is a general limitation of Infiniband, which is intended only as a short reach (<150 m optical or <5 m electrical) interface between switches connecting computer centers. There is a direct need to provide a seamless and transparent WAN connection for geographically separated computation and storage centers, with required distances ranging from hundreds of kilometers to thousands of kilometers or more.

BRIEF SUMMARY OF THE INVENTION

In various exemplary embodiments, the present invention provides a high-speed 100G optical transceiver for various Infiniband and Ethernet client signals and interfaces. The optical transceiver utilizes an architecture which relies on standards-compliant (i.e., multi-sourced) physical client interfaces. These client interfaces are back-ended with flexible, programmable Field Programmable Gate Array (FPGA) modules to accomplish either InfiniBand or Ethernet protocol control, processing, re-framing, and the like. Next, signals are encoded with Forward Error Correction (FEC) and can include additional Optical Transport Unit/Network (OTU/OTN) compliant framing structures. The resulting data is processed appropriately for the subsequent optical re-transmission, such as, for example, with differential encoding, Gray encoding, I/Q Quadrature encoding, and the like. The data is sent to an optical transmitter block and modulated onto an optical carrier. Also, the same process proceeds in reverse on the receive side.

In an exemplary embodiment, an optical transceiver includes processing circuitry adapted to receive signals according to a protocol, wherein the processing circuitry is configured to perform protocol control, processing, and reframing on the signals, based on the protocol; framing circuitry connected to the processing circuitry, wherein the framing circuitry is configured to perform Forward Error Correction (FEC) and framing; and an optical modulator and an optical demodulator connected to the framing circuitry, wherein the optical modulator is configured to transmit an optical signal corresponding to the signals processed by the framing circuitry and the processing circuitry, and wherein the optical demodulator is configured to receive an optical signal and provide the received optical signal to the framing circuitry and the processing circuitry. The optical transceiver can further include a client interface module with one or more physical client interfaces, wherein the client interface module is configured to interface with the signals according to the protocol, wherein the one or more physical client interfaces are standards-compliant and multi-sourced. The processing circuitry can include a Field Programmable Gate Array configured for the protocol control, processing, and reframing based on the protocol. The framing circuitry can utilize an Optical Transport Unit (OTU) compliant framing structure. The signals can include a rate of up to 100 Gbps. The protocol can be Ethernet, Infiniband, or the like.

In another exemplary embodiment, an optical transceiver method includes providing processing circuitry adapted to receive signals according to a protocol, wherein the processing circuitry is configured to perform protocol control, processing, and reframing on the signals, based on the protocol; providing framing circuitry connected to the processing circuitry, wherein the framing circuitry is configured to perform Forward Error Correction (FEC) and framing; and providing an optical modulator and an optical demodulator connected to the framing circuitry, wherein the optical modulator is configured to transmit an optical signal corresponding to the signals processed by the framing circuitry and the processing circuitry, and wherein the optical demodulator is configured to receive an optical signal and provide the received optical signal to the framing circuitry and the processing circuitry. The optical transceiver method can include providing a client interface module with one or more physical client interfaces, wherein the client interface module is configured to interface with the signals according to the protocol, wherein the one or more physical client interfaces are standards-compliant and multi-sourced. The processing circuitry can include a Field Programmable Gate Array configured for the protocol control, processing, and reframing based on the protocol. The framing circuitry can utilize an Optical Transport Unit (OTU) compliant framing structure. The signals can include a rate of up to 100 Gbps. The protocol can be Ethernet, Infiniband, or the like.

In yet another exemplary embodiment, a High Performance Computing (HPC) interconnection system includes a first client interface module communicatively coupled to a first optical modulator and a first optical demodulator; and a second client interface module communicatively coupled to a second optical modulator and a second optical demodulator, wherein the first optical modulator is communicatively coupled to the second optical demodulator and the second optical modulator is communicatively coupled to the first optical module, wherein the first client interface module and the second client interface module each include one or more physical client interfaces configured to interface with signals according to a protocol, processing circuitry, wherein the processing circuitry is configured to perform protocol control, processing, and reframing on the signals, based on the protocol, and framing circuitry connected to the processing circuitry, wherein the framing circuitry is configured to perform Forward Error Correction (FEC) and framing. The one or more physical client interfaces can be standards-compliant and multi-sourced. The processing circuitry can include a Field Programmable Gate Array configured for the protocol control, processing, and reframing based on the protocol. The framing circuitry can utilize an Optical Transport Unit (OTU) compliant framing structure. The protocol can be Ethernet, Infiniband, or the like.

In an exemplary embodiment of the present invention, a high-speed optical transceiver for Infiniband and Ethernet includes one or more physical client interfaces configured to receive client signals including one of Infiniband and Ethernet; processing circuitry connected to the one or more physical client interfaces for receiving the client signals, wherein the processing circuitry is configured to perform one of Infiniband and Ethernet control and processing on the client signals; framing circuitry receiving an output from the processing circuitry, wherein the framing circuitry is configured to provide framing on the output from the processing circuitry; an optical demodulator providing a framed input to the framing circuitry, wherein the optical demodulator is configured to receive a first optical signal and to demodulate the first optical signal; and an optical modulator receiving a framed output from the framing circuitry, wherein the optical modulator is configured to modulate a second optical signal responsive to the framed output and to transmit the second optical signal. The one or more physical client interfaces can include standards-compliant interfaces including one of Quad Small Form-factor Pluggables (QSFP), 10 Gigabit Small Form Factor Pluggable including one of XFP and SFP+, and native 40 Gbps and 100 Gbps interfaces. Optionally, the processing circuitry is configured to: terminate 10b Infiniband flows into native 8b data; and map the native 8b data and respective control characters into a Transparent Generic Framing Protocol superblock. Alternatively, the processing circuitry is configured to: terminate Ethernet flows; and map the Ethernet flows and respective control characters into a Transparent Generic Framing Protocol superblock. The one or more physical client interfaces can include 4× double data rate (DDR) 10b Infiniband flows.

The framing circuitry is configured to aggregate one or more Transparent Generic Framing Protocol (GFP-T) superblocks into an Optical Transport Network frame. The Optical Transport Network frame includes an asynchronously mapped Optical Channel Transport Unit-3+. The framing circuitry can be configured to map a first superblock, a second superblock, and a third superblock into an asynchronously mapped Optical Channel Transport Unit-3+; wherein each of the first superblock, the second superblock, and the third superblock include processed Infiniband flows by the processing circuitry from a 4× double data rate (DDR) interface. Optionally, the framing circuitry includes a first register, a second register, and a third register connection to a first-in-first-out buffer; wherein the processed Infiniband flows from the first superblock, the second superblock, and the third superblock are loaded into the first register and the second register; wherein the framing circuitry further includes a plurality of multiplexers configured to select outputs from the first register, the second register, and a core header constructor to load the third register; and wherein the third register is configured to load the first-in-first-out buffer. The optical demodulator and the optical modulator connect to the framing circuitry through a SerDes Framer Interface Level 5+ interface. Optionally, the optical demodulator and the optical modulator are configured to utilize Differential Quadrature Phase Shift Keying.

In another exemplary embodiment of the present invention, a processing and framing circuit for a high-speed optical transceiver for Infiniband includes a first Infiniband processing circuit configured to map a first input Infiniband flow into a first Transparent Generic Framing Protocol (GFP-T) superblock and to demap the first GFP-T superblock into the first input Infiniband flow; a second Infiniband processing circuit configured to map a second input Infiniband flow into a second GFP-T superblock to demap the second GFP-T superblock into the second input Infiniband flow; a third Infiniband processing circuit configured to map a third input Infiniband flow into a third GFP-T superblock to demap the third GFP-T superblock into the third input Infiniband flow; a superblock multiplexer configured to multiplex the first GFP-T superblock, the second GFP-T superblock, and the third GFP-T superblock into a transmit composite signal; a framing circuit configured to frame the transmit composite signal into an transmit Optical Transport Network frame; a SerDes Framer Interface Level 5+ interface configured to transmit the transmit Optical Transport Network frame and to receive a receive Optical Transport Network frame; a de-framing circuit configured to de-frame the receive Optical Transport Network frame into a receive composite signal; and a superblock demultiplexer configured to demultiplex the receive composite signal into the first GFP-T superblock, the second GFP-T superblock, and the third GFP-T superblock. The processing and framing circuit can further include a first 4× double data rate (DDR) interface connected to the first Infiniband processing circuit; a second 4× double data rate (DDR) interface connected to the second Infiniband processing circuit; and a third 4× double data rate (DDR) interface connected to the third Infiniband processing circuit. Each of the first Infiniband processing circuit, the second Infiniband processing circuit, and the third Infiniband processing circuit are configured to: terminate 10b Infiniband flows into native 8b data; and map the native 8b data and respective control characters into a GFP-T superblock. An optical demodulator and an optical modulator connect to the SerDes Framer Interface Level 5+ interface.

In yet another exemplary embodiment of the present invention, a high-speed Ethernet transceiver includes physical client interfaces configured to receive Ethernet client signals; processing circuitry connected to the physical client interfaces for receiving the Ethernet client signals, wherein the processing circuitry is configured to perform Ethernet control and processing on the Ethernet client signals; framing circuitry receiving an output from the processing circuitry, wherein the framing circuitry is configured to provide framing on the output from the processing circuitry; an optical demodulator providing a framed input to the framing circuitry, wherein the optical demodulator is configured to receive a first optical signal and to demodulate the first optical signal; and an optical modulator receiving a framed output from the framing circuitry, wherein the optical modulator is configured to modulate a second optical signal responsive to the framed output and to transmit the second optical signal. The processing circuitry is configured to: terminate Ethernet flows; and map the Ethernet flows and respective control characters into a Transparent Generic Framing Protocol superblock. The framing circuitry is configured to aggregate one or more Transparent Generic Framing Protocol (GFP-T) superblocks into an Optical Transport Network frame. The Optical Transport Network frame can include an asynchronously mapped Optical Channel Transport Unit-3+. The optical demodulator and the optical modulator connect to the framing circuitry through a SerDes Framer Interface Level 5+ interface; and the optical demodulator and the optical modulator are configured to utilize Differential Quadrature Phase Shift Keying.

BRIEF DESCRIPTION OF THE DRAWINGS

The present invention is illustrated and described herein with reference to the various drawings, in which like reference numbers denote like system components, and in which.

DETAILED DESCRIPTION OF THE INVENTION

Figure 1:
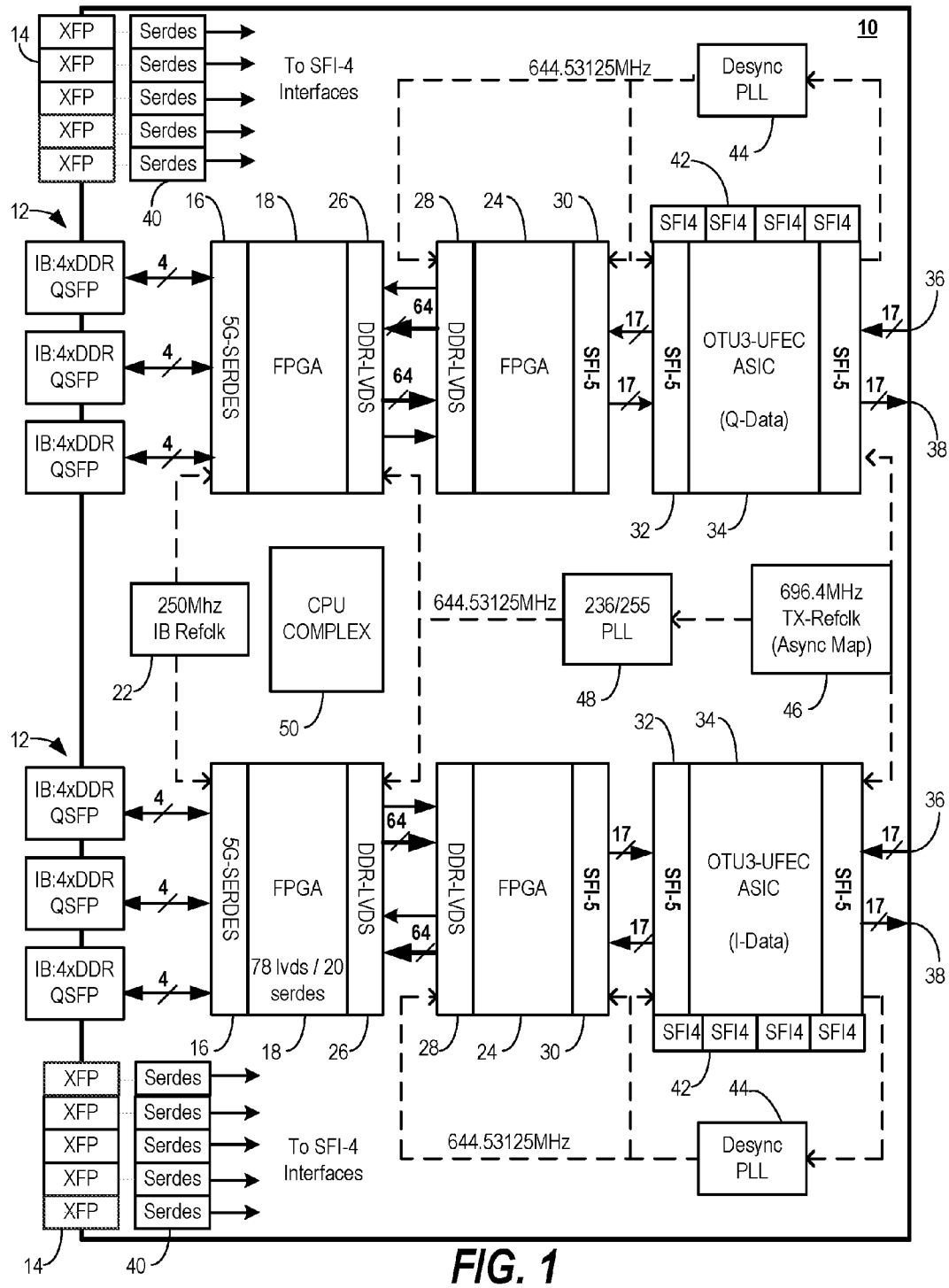
FIG. 1 is a block diagram of a 100G client interface module capable of 5×10 G ODTU23+ (Optical channel Data Tributary Unit 2 into 3+) according to an exemplary embodiment of the present invention.

In various exemplary embodiments, the present invention provides a high-speed 100G optical transceiver for InfiniBand and Ethernet to frame InfiniBand (IB) and Ethernet into transparent Generic Framing Protocol (GFP-T). The optical transceiver utilizes an architecture which relies on standards-compliant (i.e., multi-sourced) physical client interfaces. These client interfaces are back-ended with flexible, programmable Field Programmable Gate Array (FPGA) modules to accomplish either TB or Ethernet protocol control, processing, re-framing, and the like. Next, signals are encoded with Forward Error Correction (FEC) and can include additional Optical Transport Unit (OTU) compliant framing structures. The resulting data is processed appropriately for the subsequent optical re-transmission, such as, for example, with differential encoding, Gray encoding, I/Q Quadrature encoding, and the like. The data is sent to an optical transmitter block and modulated onto an optical carrier. Also, the same process proceeds in reverse on the receive side.

Specifically for TB, the present invention provides for the transport of up to 100 Gbps of 8b/10b IB client data over optical fiber. The present invention starts with state-of-the-art TB interfaces, such as 4× double data rate (DDR) or 4×5 Gbps each, terminates these 10b flows into their native 8b data, maps these packets and their respective control characters and packets using GFP-T as defined in ITU G.7041, which is herein incorporated by reference. With each 4×DDR IB logical packet flow mapped into its own GFP-T "super-block" channel, then three 4×DDR-based super-blocks can be aggregated and carried over a single asynchronously mapped Optical Channel Transport Unit-3+ (OTU3+) signal. The OTU3+ is an extension of ITU G.709 OTN standard to 50 Gbps transport. This could then be carried on a 50 Gbps wavelength or further aggregated with another 50 Gbps flow and carried using various multiple bits per symbol modulation formats such as Differential Quadrature Phase Shift Keying (DQPSK) and the like to provide a full 100 Gbps wavelength.

Similar to above, five 10 Gbps Ethernet flows can be aggregated and mapped into a single OTU3+ signal. These can be further processed and multiplexed in the optical domain to provide a complete 100 Gbps Ethernet flow per wavelength.

Advantageously, the present invention provides a seamless and transparent WAN connection for geographically-separated computation and storage centers, with required distances ranging from hundreds to thousands of kilometers. IB is a scalable IO interconnect and high-bandwidth communications protocol, specifically designed and tailored to inherently support CPU node expansion (scalability) in multi-processor-based HPCs. A need for real-time WAN connectivity in HPC applications opens the door to many unrealized computational notions today. Particularly true Petabyte scale storage and backup of information, the ability to stream hundreds of gigabytes per second of results from one location to another in real-time, the ability to partition complex computational problems across many geographically separated computers and share voluminous intermediate results and data, as well as many others.

The present invention provides a viable approach to solving this WAN connection problem. The invention provides an efficient and scalable approach to providing WAN connectivity of IB clients using standard signaling protocols such as GFP and OTN transport framing. Advantageously, the present invention can also be utilized with 100 Gbps Ethernet transport, whenever the standard becomes developed and formalized.

Referring to FIG. 1, a 100G client interface module 10 capable of 5×10 G ODTU23+ (Optical channel Data Tributary Unit 2 into 3+) is illustrated according to an exemplary embodiment of the present invention. Generally, the client interface module 10 is configured to provide client interfaces, protocol control, processing, re-framing, forward error correction (FEC) coding, encoding, and the like. The client interface module 10 includes standards-compliant and multi-sourced physical client interfaces, such as QSFPs 12, XFPs 14, or any future-defined interfaces, such as native 40 Gbps and 100 Gbps interfaces. The QSFPs 12 are Quad (4-channel) Small Form-factor Pluggables (QSFP). The XFPs 14 are 10 Gigabit Small Form Factor Pluggable (XFP).

In one exemplary embodiment, the client interface module 10 utilizes QSFPs 12 to provide 4×DDR (double) IB connections. Each QSFP 12 provides 4×5 Gbps of IB, and forwards these to terminate the 10b flows into their native 8b data within the FPGA 18. For example, the QSFPs 12 can include 850 nm Vertical-cavity surface-emitting laser (VC-SEL) parallel optics based interfaces. The QSFPs 12 connect to 5 G Serializers/Deserializes (SERDES) 16 on an FPGA 18. This connection utilizes four data lines with each set of lines up to 20 Gbps of 10b data throttled with flow control down to 16 Gbps. Combining three of these, a total of 48 Gbps of IB data payload is handled though the FPGA 18 in this configuration. A 250 MHz IB reference clock 22 is connected to each of the SERDES 16.

The client interfaces 12,14 are back-ended with flexible, programmable FPGA modules 18,24 to provide either InfiniBand or Ethernet protocol control, processing, re-framing, and the like. The FPGAs 18,24 are interconnected through low voltage differential signaling (LVDS) data lines 26,28. The FPGAs 18,24 are configured to map decoded IB or Ethernet traffic into 64b/65b GFP-T Superblocks, and to implement IB Link Layer Interface with flow control and 8b/10b decode with fixed rate adaptation. The second FPGA 24 provides a SerDes Framer Interface Level 5 (SFI-5+) 30 interface to another SFI-5+ 32 interface on an OTU3+-UFEC FPGA or application specific integrated circuit (ASIC) 34. The present invention is illustrated with respect to emerging 50 Gbps standards, such as OTU3+. Those of ordinary skill in the art will recognize the present invention can also apply to other standards for 50 Gbps and 100 Gbps that are defined in the future.

The OTU3+-UFEC ASIC 34 maps an Optical Channel Payload of Unit 3+ (OPU3+) to OTU3+ steams to be synchronized. The ASIC 34 also encodes/decodes forward error correction (FEC). The ASIC 34 includes a receive SFI-5+ interface 36 and a transmit SFI-5+ interface 38. The SFI-5+ interfaces 36,38 are connected to an optical transceiver, such as through a backplane connection or the like. The client interface module 10 is configured to support 82.5 G of 8b-data (i.e., 101.5 G of IB 10b-data) on a single wavelength. For example, the SFI-5+ interfaces 36,38 can connect to a DQPSK modulator and demodulator to transmit the data on a single wavelength.

Alternatively, the client interface module 10 can include the XFP 14 interfaces connected to SERDES 40. The XFP 14 interfaces can be used for Ethernet data traffic. Here, the SERDES 40 connected to SERDES Framer Interface Level 4 (SFI-4) interfaces 42 on the OTU3+-UFEC ASIC 34. Additionally, the client interface module 10 can be configured to include native 40 Gbps and 100 Gbps client interfaces instead of the client interfaces 12,14. These can include any future-defined native 40 Gbps and 100 Gbps client interfaces, and these native 40 Gbps and 100 Gbps client interfaces can be connected to corresponding SERDES interfaces (depending on the interface rates) on the OTU3+-UFEC ASIC 34.

Additionally, the client interface module 10 includes a desynchronization phase lock loop (PLL) between the ASIC 34 and the FPGAs 18,24. There is also a Transmission reference clock 46 provided to the ASIC 34 and to a PLL 48 which provides a signal to the FPGA 18. Finally, the module 10 includes a processor complex 50 which generally can provide card level control and monitoring functionality.

Figure 2:
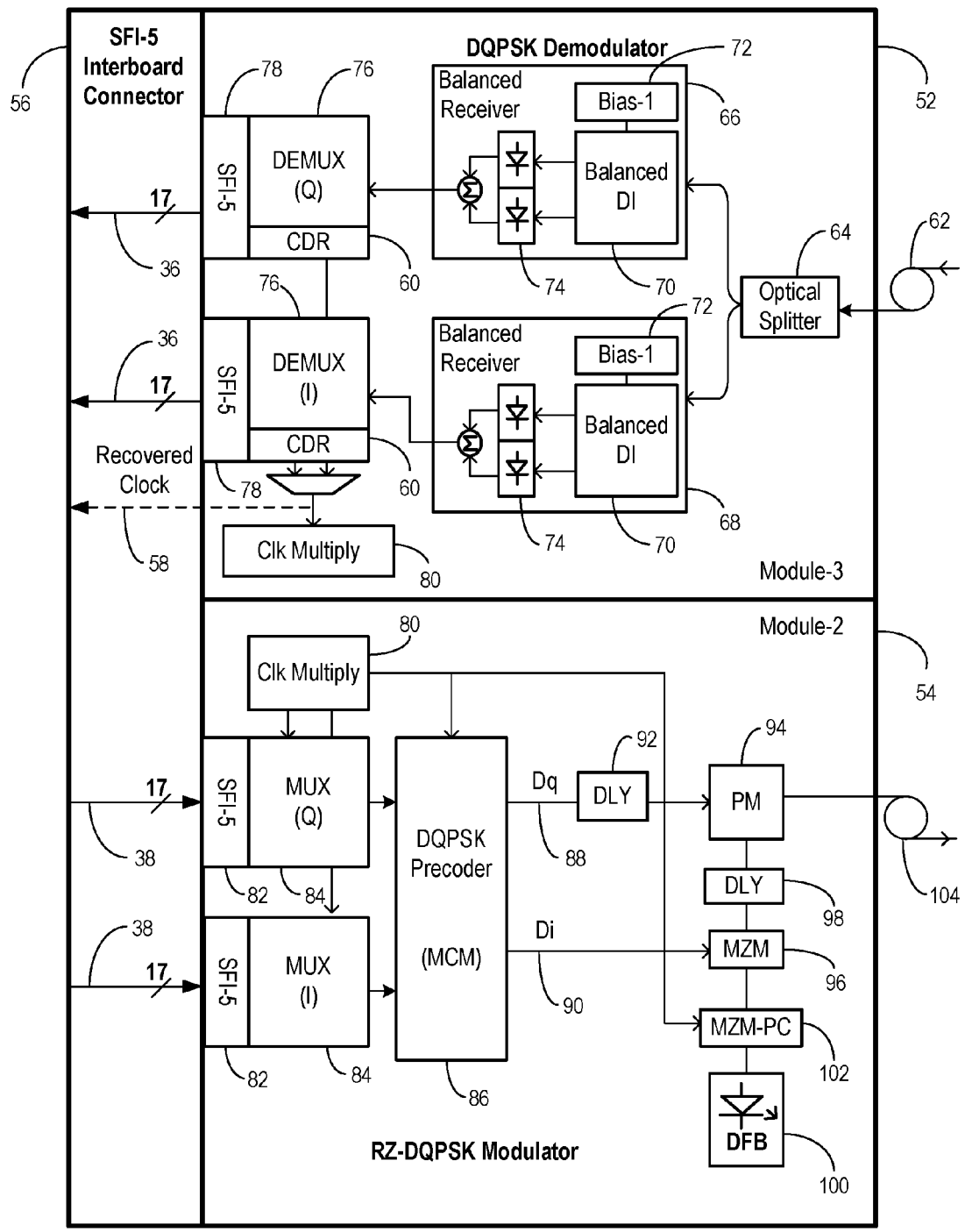
FIG. 2 is a block diagram of an optical demodulator and an optical modulator configured to interface with the 100G client interface module of FIG. 1 according to an exemplary embodiment of the present invention.

Referring to FIG. 2, an optical demodulator 52 and an optical modulator 54 configured to interface with the 100G client interface module 10 are illustrated according to an exemplary embodiment of the present invention. A SFI-5+ interboard connector 56 is configured with interconnections to the SFI-5+ interfaces 36,38 from the 100G client interface module 10 of FIG. 1. The receive SFI-5+ interface 36 and the transmit SFI-5 interface 38 are configured to provide synchronized signal flows to/from the 100G client interface module 10 to/from the optical demodulator 52 and the optical modulator 54. The interboard connector 56 also includes a recovered clock 58 which is provided to the client interface module 10 from a clock and data recovery (CDR) circuit 60 on the optical demodulator 52.

Collectively, the optical demodulator 52 and the optical modulator 54 are configured to provide a modulated/demodulated optical signal. In this exemplary embodiment, the optical demodulator 52 and the optical modulator 54 are illustrated with Return-to-Zero (RZ) differential quadrature phase shift keying (DQPSK). Those of ordinary skill in the art will recognize that the client interface module 10 can be used with any type of modulator/demodulator and that RZ-DQSPK is shown for illustration purposes. RZ-DQPSK transmits symbols at a rate half that of the bit rate. For example, a 100 Gb/s signal rate corresponds to a 50 Gb/s bit rate in RZ-DQPSK since each symbol transmits two bits.

The optical demodulator 52 receives an optical signal input 62 and splits the received input 62 with an optical splitter 64. Outputs from the optical splitter 64 are provided to two separate balanced receivers 66,68. Each of the separate balanced receivers 66,68 include a balanced delay interferometer (DI) 70 coupled to a bias 72. The DI 70 provide signal delay to measure phase differences of the input signal with photo-detectors 74. For example, the balanced receiver 66 can be configured to demodulate in-phase data (I-data) and the balanced receiver 68 can be configured to demodulate quadrature data (Q-data).

Each of the balanced receivers 66,68 connect to a demultiplexer 76 which performs serial to parallel conversion. Also, the CDR 60 can be integrated within the demultiplexer 76 or a separate interconnected circuit. The demultiplexers 76 include an SFI-5 interface 78 which provides an output to the receive SFI-5 interface 36 of the client interface module 10. The CDR 60 can provide a recovered clock based on a multiplier factor provided by a clock multiply 80.

The optical modulator 54 receives an input signal from the transmit SFI-5+ interface 38 of the client interface module 10 at a SFI-5+ interface 82 on a multiplexer 84. Here, one of the multiplexers 84 is utilized for Q-data and one for I-data. The multiplexers 84 provide parallel to serial conversion and output a signal to a DQPSK precoder 86. The DQPSK precoder 86 is configured to precode the signal as required for DQPSK modulation. The DQPSK precoder 86 includes a Q-data output 88 (Dq) and an I-data output 90 (Di). Dq 88 is delayed with a delay (DLY) 92 and then provided to a phase modulator (PM) 94. Di is input into a Mach-Zehnder modulator (MZM) 96 with an output provided to a delay (DLY) 98. The output of the delay 98 is provided to the PM 94. A distributed feedback laser (DFB) 100 is input into a MZM phase control (MZM-PC) 102 which is subsequently provided to the MZM 96. The output of the PM 94 is provided as an optical output 104.

Figure 3:
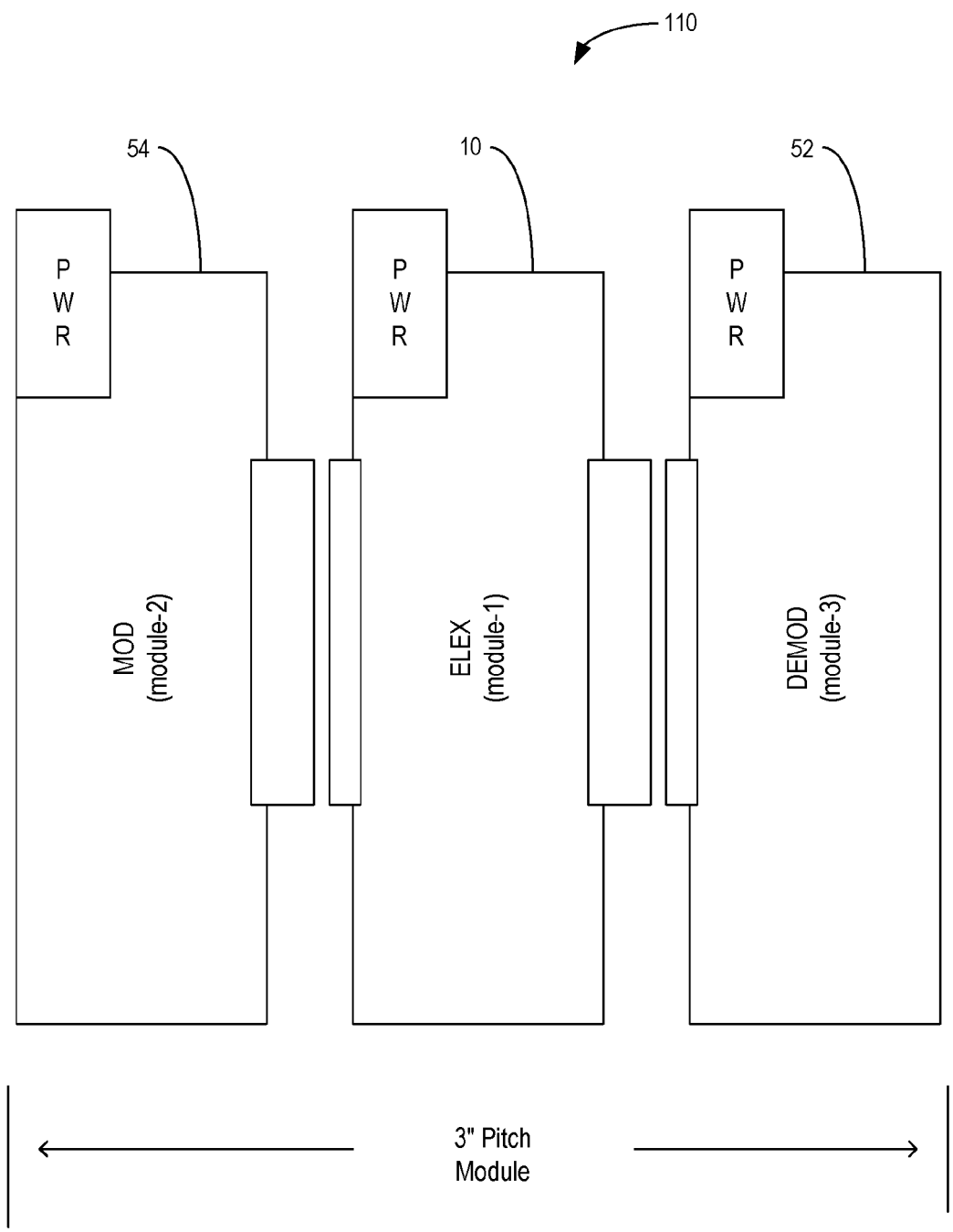
FIG. 3 is a shelf diagram of module placement of the client interface module, the optical demodulator, and the optical modulator according to an exemplary embodiment of the present invention.

Referring to FIG. 3, a shelf diagram illustrates module placement 110 of the client interface module 10, the optical demodulator 52, and the optical modulator 54 according to an exemplary embodiment of the present invention. Each module 10,52,54 can be contained within a separate line card. The line card is configured to interface with a network element chassis or shelf, such as through a backplane. The backplane can enable inter-card communications and further provide card control, monitoring, and power.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. An optical transceiver comprising:
    processing circuitry adapted to receive signals according to a protocol comprising one of Ethernet and Infiniband, wherein the processing circuitry is configured to perform protocol control, processing, and reframing on the signals, based on the protocol;
    framing circuitry connected to the processing circuitry, wherein the framing circuitry is configured to perform Forward Error Correction (FEC) and framing; and
    an optical modulator and an optical demodulator connected to the framing circuitry, wherein the optical modulator is configured to transmit an optical signal with in-phase data and quadrature data corresponding to the signals processed by the framing circuitry and the processing circuitry, and wherein the optical demodulator is configured to receive an optical signal with in-phase data and quadrature data and provide the received optical signal to the framing circuitry and the processing circuitry.

2. The optical transceiver of claim 1, further comprising:
    a client interface module with one or more physical client interfaces,
    wherein the client interface module is configured to interface with the signals according to the protocol, and
    wherein the one or more physical client interfaces are standards-compliant and multi-sourced.

3. The optical transceiver of claim 1, wherein the processing circuitry comprises a Field Programmable Gate Array configured for the protocol control, processing, and reframing based on the protocol.

4. The optical transceiver of claim 1, wherein the framing circuitry utilizes an Optical Transport Unit (OTU) compliant framing structure.

5. The optical transceiver of claim 1, wherein the signals comprise a rate of up to 100 Gbps.

6. The optical transceiver of claim 1, wherein the protocol is Ethernet.

7. The optical transceiver of claim 1, wherein the protocol is Infiniband.

8. An optical transceiver method comprising:
    providing processing circuitry adapted to receive signals according to a protocol comprising one of Ethernet and Infiniband, wherein the processing circuitry is configured to perform protocol control, processing, and reframing on the signals, based on the protocol;
    providing framing circuitry connected to the processing circuitry, wherein the framing circuitry is configured to perform Forward Error Correction (FEC) and framing; and
    providing an optical modulator and an optical demodulator connected to the framing circuitry, wherein the optical modulator is configured to transmit an optical signal with in-phase data and quadrature data corresponding to the signals processed by the framing circuitry and the processing circuitry, and wherein the optical demodulator is configured to receive an optical signal with in-phase data and quadrature data and provide the received optical signal to the framing circuitry and the processing circuitry.

9. The optical transceiver method of claim 8, further comprising:
    providing a client interface module with one or more physical client interfaces,
    wherein the client interface module is configured to interface with the signals according to the protocol, and
    wherein the one or more physical client interfaces are standards-compliant and multi-sourced.

10. The optical transceiver method of claim 8, wherein the processing circuitry comprises a Field Programmable Gate Array configured for the protocol control, processing, and reframing based on the protocol.

11. The optical transceiver method of claim 8, wherein the framing circuitry utilizes an Optical Transport Unit (OTU) compliant framing structure.

12. The optical transceiver method of claim 8, wherein the signals comprise a rate of up to 100 Gbps.

13. The optical transceiver method of claim 8, wherein the protocol is Ethernet.

14. The optical transceiver method of claim 8, wherein the protocol is Infiniband.

15. A High Performance Computing (HPC) interconnection system comprising:
    a client interface module communicatively coupled to an optical modulator and an optical demodulator;
    wherein the client interface module comprises
        one or more physical client interfaces configured to interface with signals according to a protocol comprising one of Ethernet and Infiniband,
        processing circuitry, wherein the processing circuitry is configured to perform protocol control, processing, and reframing on the signals, based on the protocol, and framing circuitry connected to the processing circuitry, wherein the framing circuitry is configured to perform Forward Error Correction (FEC) and framing; and wherein the optical modulator is configured to transmit an optical signal with in-phase data and quadrature data corresponding to the signals processed by the framing circuitry and the processing circuitry, and wherein the optical demodulator is configured to receive an optical signal with in-phase data and quadrature data and provide the received optical signal to the framing circuitry and the processing circuitry.

16. The HPC interconnection system of claim 15, wherein the one or more physical client interfaces are standards-compliant and multi-sourced.

17. The HPC interconnection system of claim 15, wherein the processing circuitry comprises a Field Programmable Gate Array configured for the protocol control, processing, and reframing based on the protocol.

18. The HPC interconnection system of claim 15, wherein the framing circuitry utilizes an Optical Transport Unit (OTU) compliant framing structure.

19. The HPC interconnection system of claim 15, wherein the protocol is Ethernet.

20. The HPC interconnection system of claim 15, wherein the protocol is Infiniband.

* * * * *